(12) United States Patent
Wilder et al.

(10) Patent No.: US 9,089,923 B2
(45) Date of Patent: Jul. 28, 2015

(54) CONTROL SYSTEM FOR WELDER

(71) Applicant: Lincoln Global, Inc., City of Industry, CA (US)

(72) Inventors: William D. Wilder, Cleveland, OH (US); Edward A. Enyedy, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 261 days.

(21) Appl. No.: 13/622,492

(22) Filed: Sep. 19, 2012

(65) Prior Publication Data

US 2014/0076873 A1 Mar. 20, 2014

(51) Int. Cl.
B23K 9/10 (2006.01)

(52) U.S. Cl.
CPC .................... *B23K 9/1087* (2013.01)

(58) Field of Classification Search
CPC .......... G05G 1/30; G05G 1/46; H01C 10/00; H01C 10/10; G06F 15/46; B23K 9/10
USPC .......... 219/74, 132, 130.5, 136, 147; 266/48; 338/153; 318/551
See application file for complete search history.

(56) References Cited

U.S. PATENT DOCUMENTS

| 5,486,852 | A | * | 1/1996 | Arai ........................... 348/211.2 |
| 6,103,994 | A | | 8/2000 | DeCoster et al. |
| 6,797,921 | B1 | | 9/2004 | Niedereder et al. |
| 7,375,304 | B2 | | 5/2008 | Kainec et al. |
| 2009/0302015 | A1 | | 12/2009 | Feitzlmaier et al. |
| 2010/0122974 | A1 | | 5/2010 | Savopoulos |
| 2011/0248008 | A1 | * | 10/2011 | Long et al. .................... 219/132 |

FOREIGN PATENT DOCUMENTS

| EP | 903195 | 3/1999 |
| EP | 1043107 | 10/2000 |
| JP | 2008059116 | 3/2008 |
| WO | 2008/144785 | 12/2008 |

OTHER PUBLICATIONS

"Wireless Remote Technology Improves Welding Repairs on the Ruby Pipeline", Miller Electric Manufacturing, 2012, 5 pages.
"Specialty Fabricators Go Wireless with TIG Foot Pedals: Improve Productivity and Safety, Reduce Equipment Costs", Miller Electric Manufacturing, 2012, 9 pgs.

* cited by examiner

*Primary Examiner* — Brian Jennison
(74) *Attorney, Agent, or Firm* — Calfee, Halter & Griswold LLP

(57) ABSTRACT

A system for controlling a welder supports remote operation of the welder by either a hand or a foot of the user. The controls of the system share components such that the user can readily change from hand control of the welder to foot control of the welder and vice versa.

19 Claims, 6 Drawing Sheets

CONTROL SYSTEM FOR WELDER

FIELD

The general inventive concepts relate, among other things, to methods, apparatus, systems, programs, and techniques for remotely controlling operation of a welding device.

BACKGROUND

Welding devices typically require a user to input and/or adjust operating parameters for the device, such as specifying a particular welding process to be performed. Controls on the welding device allow the user to manually perform the input and adjustment operations at the welding device. One exemplary welding device is the Invertec® V350 PRO Multi-Process Welder, Product No. K1728, manufactured and sold by the Lincoln Electric Company.

Devices for remotely controlling a welding device during a welding operation are known. These remote controls allow commands to be transmitted to and received by the welding device. The welding device processes the received commands and performs the operations corresponding to the commands. Transmission of data between a remote control and the welding device can be wired or wireless.

One type of remote control is a hand control, which allows commands to be input by the user's hand. An example of a hand control is the Hand Amptrol™, Product No. K963, manufactured and sold by the Lincoln Electric Company. Another example of a hand control is the Hand Held Remote 500, Product No. K857, manufactured and sold by the Lincoln Electric Company, as shown in FIG. 5.

Another type of remote control is a foot control, which allows commands to be input by the user's foot. An example of a foot control is the Foot Amptrol™ 600, Product No. K870, manufactured and sold by the Lincoln Electric Company, as shown in FIG. 6.

Each of these different remote control devices may be better suited to specific welding methods and situations. Furthermore, different users may have different preferences for remote control devices. Accordingly, there is an unmet need for a control system that can readily support remote, wireless operation of a welding device by either a hand or a foot of the user through the sharing of components.

SUMMARY

By way of example to illustrate various aspects of the general inventive concepts, several exemplary methods, devices, and systems are disclosed herein.

One exemplary aspect of the general inventive concepts is that a single communications means, such as a transceiver or other communications circuitry, logic, or the like, is usable by any one of several distinct controllers.

A system for controlling a welder, according to one exemplary embodiment, is disclosed. The system includes a hand control including first means for remotely adjusting an operating parameter of the welder and a foot control including second means for remotely adjusting an operating parameter of the welder. The system also includes logic for detecting if the hand control is interfaced with (e.g., inserted in) the foot control. If the hand control is interfaced with the foot control, the foot control is active (i.e., able to control the welder) and the hand control is inactive (i.e., prevented from controlling the welder). In one exemplary embodiment, if the hand control is not interfaced with the foot control, the foot control is inactive and the hand control is active.

In one exemplary embodiment, the hand control is sized to fit in a hand of the user so that the user can manipulate the first means using one or more fingers on his hand.

In one exemplary embodiment, the foot control includes an upper housing and a lower housing, and wherein the upper housing is movable relative to the lower housing. In one exemplary embodiment, the second means includes movement of the upper housing relative to the lower housing.

In one exemplary embodiment, the upper housing of the foot control includes a cavity. The hand control interfaces with the foot control by placement of at least a portion of the hand control within the cavity.

In one exemplary embodiment, the logic is embedded in the hand control.

In one exemplary embodiment, the hand control includes transmission means for enabling wireless communication between the hand control and the welder. In one exemplary embodiment, the transmission means is an RF transceiver.

In one exemplary embodiment, if the foot control is active, the foot control uses the transmission means of the hand control to communicate with the welder.

In one exemplary embodiment, the hand control includes a power source and the foot control does not. In one exemplary embodiment, the power source includes a battery.

In one exemplary embodiment, the hand control includes a display for displaying information to the user.

In one exemplary embodiment, the first means includes a plurality of buttons.

In one exemplary embodiment, the hand control includes a potentiometer. In one exemplary embodiment, the foot control includes a potentiometer.

A method for controlling a welder, according to one exemplary embodiment, is disclosed. The method includes: providing a hand control including first means for remotely adjusting an operating parameter of the welder; providing a foot control including second means for remotely adjusting an operating parameter of the welder; detecting if the hand control is interfaced with the foot control; activating the hand control for control of the welder if the hand control is not interfaced with the foot control; and activating the foot control for control of the welder if the hand control is interfaced with the foot control. In one exemplary embodiment, the method further includes detecting if the hand control is interfaced with a piece of equipment (e.g., a helmet), wherein if the hand control is interfaced with the piece of equipment, the piece of equipment uses a transmission means within the hand control to communicate with the welder.

A method for controlling a welder, according to one exemplary embodiment, is disclosed. The method includes: providing a foot control for allowing a user to remotely adjust a first operating parameter of the welder using a foot; and removing a portion of the foot control, wherein the removed portion of the foot control functions as a hand control for allowing the user to remotely adjust a second operating parameter of the welder using a hand. In one exemplary embodiment, the first operating parameter and the second operating parameter are the same.

Given the sharing of components between different control devices, as contemplated by the general inventive concepts, numerous advantages may result. For example, and not by way of limitation, the inventive control systems may realize cost savings since fewer parts are necessary due to the sharing of components. As another example, the control systems may be readily transported (e.g., from site to site) when not in use, as one control may be stowed in the other control for each system. Similarly, storage of the control systems requires less space, as one control may be stowed in the other control for each system. As yet another example, the control systems may be simpler to configure and/or use, as each control belongs to the same overall system and thus can have similar designs, interfaces, operations, etc.

Numerous aspects of the general inventive concepts will become readily apparent from the following detailed description of exemplary embodiments, from the claims and from the accompanying drawings.

BRIEF DESCRIPTION OF THE DRAWINGS

The general inventive concepts as well as embodiments and advantages thereof are described below in greater detail, by way of example, with reference to the drawings in which.

DETAILED DESCRIPTION

Figure 1:
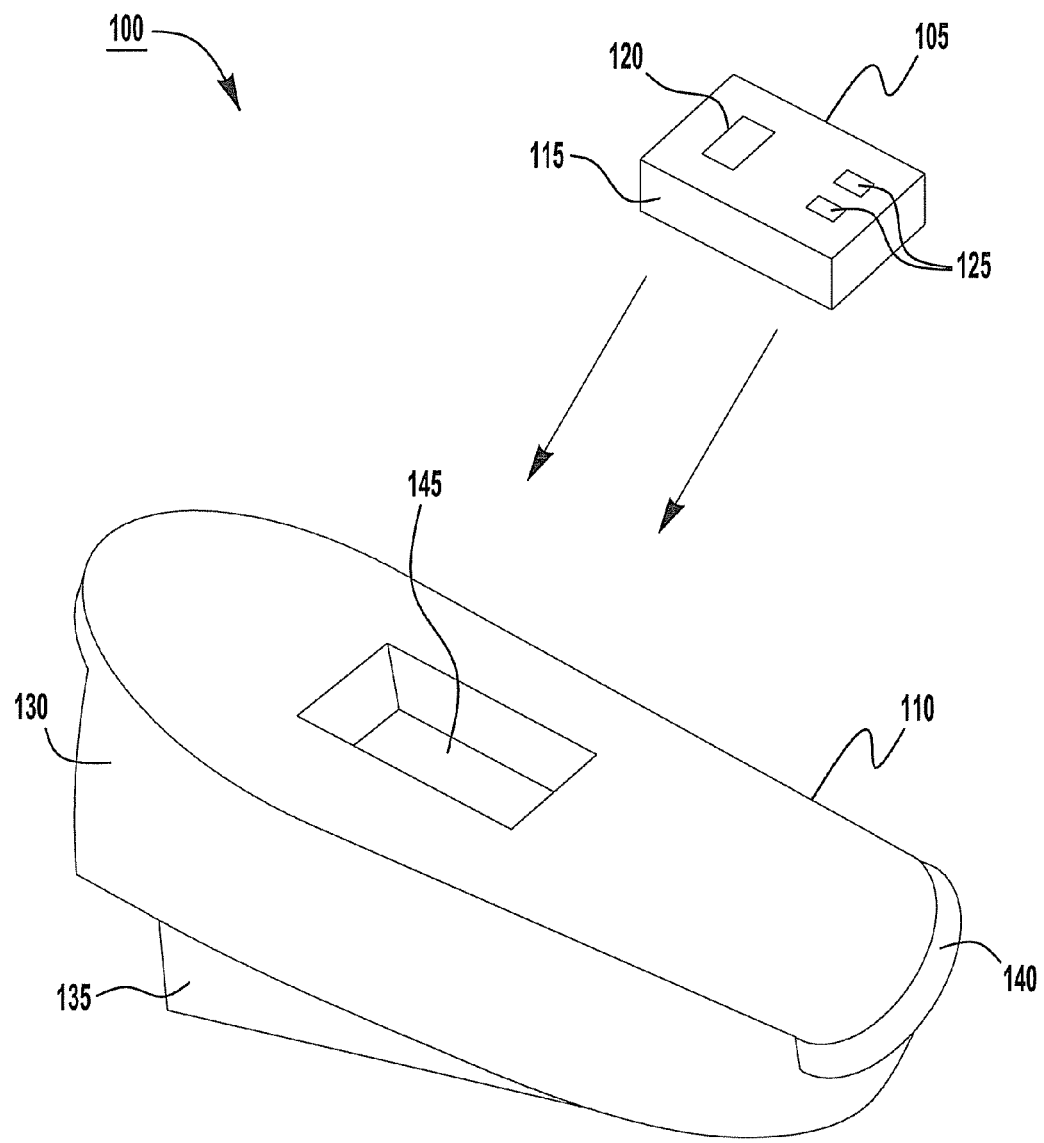
FIG. 1 is a drawing illustrating a wireless control system for a welder, according to one exemplary embodiment.

While the general inventive concepts are susceptible of embodiment in many different forms, there are shown in the drawings and will be described herein in detail specific embodiments thereof with the understanding that the present disclosure is to be considered as merely an exemplification of the principles of the general inventive concepts. Accordingly, the general inventive concepts are not intended to be limited to the specific embodiments illustrated herein.

A wireless control system 100 for a welding device, welder, power supply or the like (not shown), according to one exemplary embodiment encompassed by the general inventive concepts, is shown in FIG. 1. The wireless control system 100 allows a user to remotely control a welding process by allowing the user to select and/or adjust one or more operating parameters of the welding device or parameters otherwise associated with the welding process. These parameters could include, for example, an electrode delivery rate, a shielding gas delivery rate, a beginning and end of a welding cycle, various characteristics of the welding arc (e.g., current or amperage, voltage, pulse frequency, initial slope, final slope), etc.

The wireless control system 100 may be used across diverse methods of welding including, but not limited to, shielded metal arc welding (SMAW) or "STICK" welding, gas metal arc welding (GMAW) also known as metal inert gas (MIG) or "wire feed" welding, and gas tungsten arc welding (GTAW) or "TIG" welding. One skilled in the art will appreciate that the wireless control system 100 may also apply to other welding methods and their associated welding devices.

Figure 2:
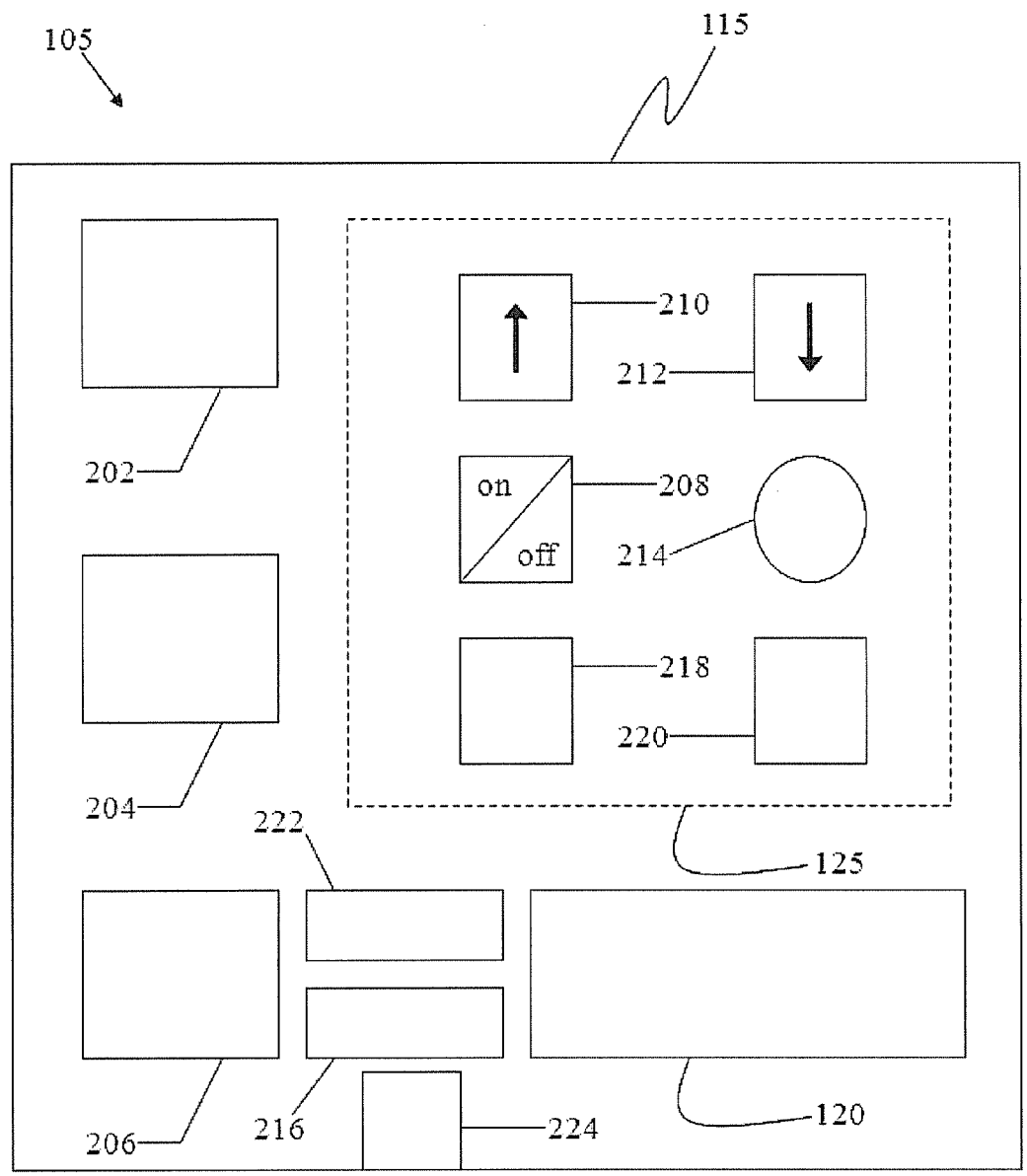
FIG. 2 is a block diagram showing a hand control, according to one exemplary embodiment, for use in the wireless control system of FIG. 1.
Figure 3:
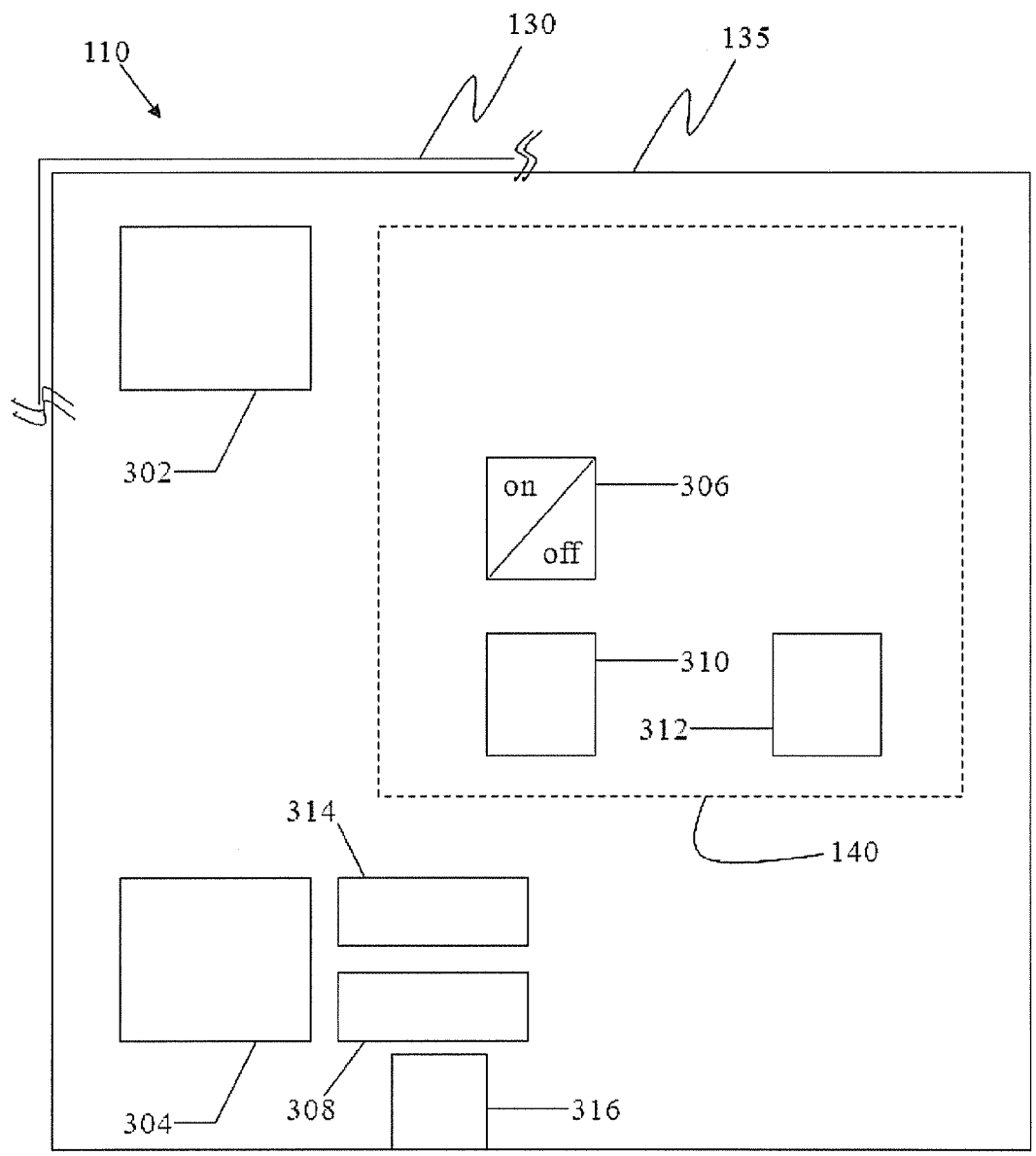
FIG. 3 is a block diagram showing a foot control, according to one exemplary embodiment, for use in the wireless control system of FIG. 1.

The wireless control system 100 includes a hand control 105 (see FIG. 2) and a foot control 110 (see FIG. 3). The hand control 105 and the foot control 110 are remote controls, i.e., controls that are separate from and not physically part of the welding device itself. Furthermore, the hand control 105 and the foot control 110 are wireless devices that are readily portable by the user.

As shown in FIG. 2, the hand control 105 of the wireless control system 100 includes a housing 115. The housing is sized to fit in a hand of a typical user. In one exemplary embodiment, the housing has dimensions of approximately 6"×3"×2.5". The housing 115 may include a display 120, such as an LCD panel or screen, and one or more controls 125. The controls 125 may take any form suitable for manipulation by the user's fingers or hands. For example, the controls 125 could take the form of one or more buttons, knobs, dials, switches, sliding members, rockers, etc. In one exemplary embodiment, the controls 125 could employ voice or sound recognition.

The housing 115 of the hand control 105 encloses a power source 202, a transmission means 204, and control logic 206.

Any power source suitable for powering the functionality of the hand control 105 can be used. For example, the power source 202 could be one or more batteries (e.g., AAA batteries). The batteries could be disposable or rechargeable.

The transmission means 204 typically includes a transceiver for sending information to the welding device and receiving information from the welding device. In one exemplary embodiment, the transmission means uses a one-way transmitter. The transmission means can include other components (e.g., an antenna) as well. Communications between the hand control 105 and the welding device are wireless. Any suitable wireless communications technology or protocol can be used. In one exemplary embodiment the transmission means uses radio frequency (RF) communications.

The control logic 206 includes all internal components and related circuitry and wiring needed for operation of the hand control 105. For example, the control logic interfaces with the power source 202 and transmission means 204. The control logic 206 manages the display 120 of the hand control 105. The control logic 206 also manages the controls 125 of the hand control 105. For example, the control logic 206 can detect a state change in a switch (e.g., an on/off switch 208) amongst the controls 125. Likewise, the control logic includes a potentiometer that is used to detect magnitude adjustments being made to an operating parameter (e.g., welding current), for example, using up and down buttons 210 and 212 amongst the controls 125. In one exemplary embodiment, the control logic 206 includes a "switchpot," which is a potentiometer and a switch tied together, such that manipulation of a single control (e.g., a dial 214) amongst the controls 125 by the user can control both the potentiometer and the switch. In one exemplary embodiment, the control logic 206 includes one or more programmable components (e.g., an EPROM 216) and can be configured and/or updated to change or augment the functionality of the hand control 105.

The display 120 of the hand control 105 can be used, for example, to display one or more current operating parameters for a welding process. In one exemplary embodiment, the operating parameters are selectively shown on the display 120 in response to user input. In one exemplary embodiment, various operating parameters are periodically shown on the display 120 according to a preprogrammed or otherwise preselected routine. The display 120 can also be used to display any other pertinent information to the user.

As noted above, the controls 125 allow the user to select and/or make adjustments to various operating parameters by manipulating the controls 125 using either of his hands and/or the fingers thereon. As a result, the hand control 105 is capable of controlling an operating parameter, such as welding current, over a range of values.

In one exemplary embodiment, the controls 125 include additional controls such as buttons 218 and 220, which can each be associated with a profile. A profile is a preset configuration of operating parameters suitable for a particular welding process and/or set of welding conditions. In this manner, the user need only manipulate a particular one of the additional controls 218 and 220 to select a desired profile. In one exemplary embodiment, the hand control 105 and its control logic 206 allows the user to program and store one or more profiles for later retrieval using the hand control 105. The profiles can either be stored on the welding device or the hand control 105 itself. In one exemplary embodiment, if profiles are to be stored on the hand control 105, the hand control 105 includes internal memory 222 for doing so. In one exemplary embodiment, the hand control 105 includes a port (e.g., a USB port 224) for interfacing with an external storage device (e.g., a USB flash drive) for accessing and/or storing one or more profiles.

The foot control 110 of the wireless control system includes an upper housing 130 and a lower housing 135. The foot control 110 (including the upper housing 130 and the lower housing 135) is sized to be readily portable. The foot control is also sized and/or shaped to be operable by a foot of a typical user. In one exemplary embodiment, the foot control 110 has dimensions of approximately 11"×5"×3".

At least a portion of the upper housing 130 is movable relative to the lower housing 135 between a rest or minimum position and a maximum position. The user can place either of his feet on the foot control 110 and by exerting increased pressure thereon move the upper housing 130 from its rest position toward its maximum position. Conversely, because the upper housing 130 is normally urged toward the rest position, such as by a spring, the user can simply exert decreased pressure on the foot control 110 to allow it to move from its current position toward its rest position. In this manner, the foot control 110 provides a pedal-like action which is capable of controlling an operating parameter, such as welding current, over a range of values.

The foot control 110 may also include one or more controls 140. The controls 140 may take any form suitable for manipulation by the user's foot. For example, the controls 140 could take the form of one or more buttons, switches, sliding members, rockers, etc. In one exemplary embodiment, the upper housing 130 can tilt to the left and/or right relative to the lower housing 135, wherein the tilting of the upper housing 130 functions as such a control 140. In one exemplary embodiment, the controls 140 could employ voice or sound recognition.

The foot control 110 also includes a cavity 145 that is sized and/or shaped to accommodate the hand control 105 therein. As described herein, the foot control 110 is not fully functional unless the hand control 105 is situated within the cavity 145 of the foot control 110.

The foot control 110 does not include its own transmission means. Instead, the foot control 110 uses the transmission means 204 enclosed within the housing 115 of the hand control 105 to send information to the welding device and receive information from the welding device. Thus, as with the hand control 105, communications between the foot control 110 and the welding device are wireless.

The foot control 110 uses the transmission means 204 enclosed in the hand control 105 (and, thus, is operable) only when the hand control 105 is interfaced with the foot control 110. Likewise, the hand control 105 ceases functioning as a remote control and instead serves only as a transmission means when the hand control 105 is interfaced with the foot control 110.

The hand control 105 interfaces with the foot control 110 by being snapped, placed, fitted, or otherwise situated within the cavity 145 of the upper housing 130 of the foot control 110. Detecting that the hand control 105 and the foot control 110 are interfaced can be carried out in any suitable manner, such as by electrical means (e.g., detecting abutment of corresponding metal contacts on each of the controls), mechanical means (e.g., having a projection on one of the controls depress a corresponding member on the other one of the controls), etc. In one exemplary embodiment, the control logic 206 and/or the control logic 304 detects when the hand control 105 and the foot control 110 are interfaced.

Once the hand control 105 is located within the cavity, 145 of the foot control 110, the foot control 110 becomes the active remote control within the wireless control system 100. Thereafter, the user can manipulate the foot control 110 including any of its controls 140 using either of his feet to select and/or make adjustments to various operating parameters of the welding device or parameters otherwise associated with a current welding process.

Decoupling the remote controls from one another (i.e., removing the hand control 105 from the cavity 145 of the foot control) essentially deactivates the foot control 110 and renders the hand control 105 the active remote control within the wireless control system 100.

The housing (i.e., the upper housing 130 and/or the lower housing 135) of the foot control 110 may include a power source 302. Any power source suitable for powering the functionality of the foot control 110 can be used. For example, the power source could be one or more batteries (e.g., AAA batteries). The batteries could be disposable or rechargeable. In one exemplary embodiment, the foot control 110 does not include its own power source but instead uses the power source enclosed within the housing 115 of the hand control 105, when the hand control 105 is interfaced with the foot control 110.

The housing (i.e., the upper housing 130 and/or the lower housing 135) of the foot control 110 may include control logic 304. The control logic 304 includes all internal components and related circuitry and wiring needed for operation of the foot control 110. For example, the control logic 304 interfaces with the power source 302.

The control logic 304 manages the controls 140 of the foot control 110. For example, the control logic 304 can detect a state change in a switch (e.g., an on/off switch 306) amongst the controls 140. Likewise, the control logic 304 includes a potentiometer that is used to detect magnitude adjustments being made to an operating parameter (e.g., welding current) by the foot control 110. In one exemplary embodiment, the control logic 304 includes a "switchpot," which is a potentiometer and a switch tied together, such that manipulation of a single control amongst the controls 140 by the user can control both the potentiometer and the switch. In one exemplary embodiment, the control logic 304 includes one or more programmable components (e.g., an EPROM 308) and can be configured and/or updated to change or augment the functionality of the foot control 110. In one exemplary embodiment, the foot control 110 does not include its own control logic but instead uses the control logic 206 embedded within the hand control 105 when the hand control 105 is interfaced with the foot control 105.

As noted above, the controls 140 allow the user to select and/or make adjustments to various operating parameters by manipulating the controls 140 using either of his feet. In one exemplary embodiment, the controls 140 include additional controls such as buttons 310 and 312, which can each be associated with a profile. A profile is a preset configuration of operating parameters suitable for a particular welding process and/or set of welding conditions. In this manner, the user need only manipulate a particular one of the additional controls 310 and 312 to select a desired profile.

In one exemplary embodiment, the foot control 110 can be "pumped" as a type of additional control. Pumping refers to quickly depressing the foot control 110 and then releasing it. For example, the user could pump the foot control 110 three times to select a third preset profile.

In one exemplary embodiment, the foot control 110 can be tilted to the left, right, or both as a type of additional control. For example, the user could tilt the foot control 110 to cycle through the profiles and/or select a particular profile.

In one exemplary embodiment, the foot control 110 and its control logic 304 allows the user to program and store one or more profiles for later retrieval using the foot control 110. The profiles can either be stored on the welding device or the foot control 110 itself. In one exemplary embodiment, if profiles are to be stored on the foot control 110, the foot control 110 includes internal memory 314 for doing so. In one exemplary embodiment, the foot control 110 includes a port (e.g., a USB port 316) for interfacing with an external storage device (e.g., a USB flash drive) for storing one or more profiles.

In one exemplary embodiment, the foot control 110 is a passive device that does not include any power source, transmission means, or control logic. In this case, the foot control 110 includes a mechanical means (not shown), such as a gear or notched dial, that interfaces with a corresponding mechanical means (not shown) on the hand control 105. When the hand control 105 is interfaced with the foot control 110, communication between the mechanical means on the on the hand control 105 and the foot control 110 allows the hand control 105 to determine an approximate amount of displacement of the upper housing 130 relative to the lower housing 135 on the foot control 110. Consequently, the foot control 110 is able to function as an active remote control through its interface with the hand control 105 which does include a power source (e.g., the power source 202), a transmission means (e.g., the transmission means 204), and control logic (e.g., the control logic 206).

Although the processing of instructions from the hand control 105 and/or the foot control 110 will typically occur at the welding device, other devices may include processing means (e.g., one or more microprocessors or the like) and associated logic for communicating with the hand control 105 and/or the foot control 110. Accordingly, the hand control 105 and/or the foot control 110 can be thought of as intelligent devices with expanded or expandable functionality. Additionally, the hand control 105 and/or the foot control 110 could themselves include processing means to further increase their respective functionality.

In one exemplary embodiment, the control logic 206 and/or processing means of the hand control 105 renders the hand control 105 suitable for plug-and-play operation. In this manner, the hand control 105 is able to automatically detect when it is being interfaced with another piece of equipment, as well as automatically detecting the equipment type. Furthermore, the hand control 105 can interface with the other equipment with little or no configuration thereof required.

When the hand control 105 is not interfaced with any other equipment, it knows to function as an active remote control for the welding device. When the hand control 105 is interfaced with the foot control 110, such as described herein, the hand control 105 knows to subjugate itself to assisting the foot control 110 in its role as the active remote control for the welding device. When the hand control 105 is interfaced with another piece of equipment, it can be programmed or otherwise designed to know its role relative to that equipment.

For example, in one exemplary embodiment, the hand control 105 is able to attach to or otherwise interface with a helmet worn by the user. In this embodiment, a switch (e.g., the switch 208) amongst the controls 125 on the hand control 105 that may have functioned as an on/off switch in a different context will function to determine if a visor on the helmet is opened or closed. If the switch determines that the visor is opened, the hand control 105 communicates with the welding device to prevent welding from commencing until the visor is closed. Thus, the hand control 105 as an intelligent device can increase safety during a welding operation.

In one exemplary embodiment, when the hand control 105 is interfaced with the helmet of the user, the display 120 of the hand control 105 may be projected on or transferred to the visor of the helmet. In this manner, the user can better see the relevant information being displayed without having to look away from the weld. Thus, the hand control 105 as an intelligent device can increase the functionality of welding equipment (e.g., a helmet).

In one exemplary embodiment, the controls 125 of the hand control 105 and/or the controls 140 of the foot control 110 can be used to control equipment related to a welding operation. For example, in one exemplary embodiment, the controls 125 or 140 are used to toggle a fume control (i.e., exhaust) system on and off.

In one exemplary embodiment, the hand control 105 is interfaced with equipment that would already be held in the user's hand, such as a welding gun, to provide increased functionality to the user using only a single hand.

Figure 4:
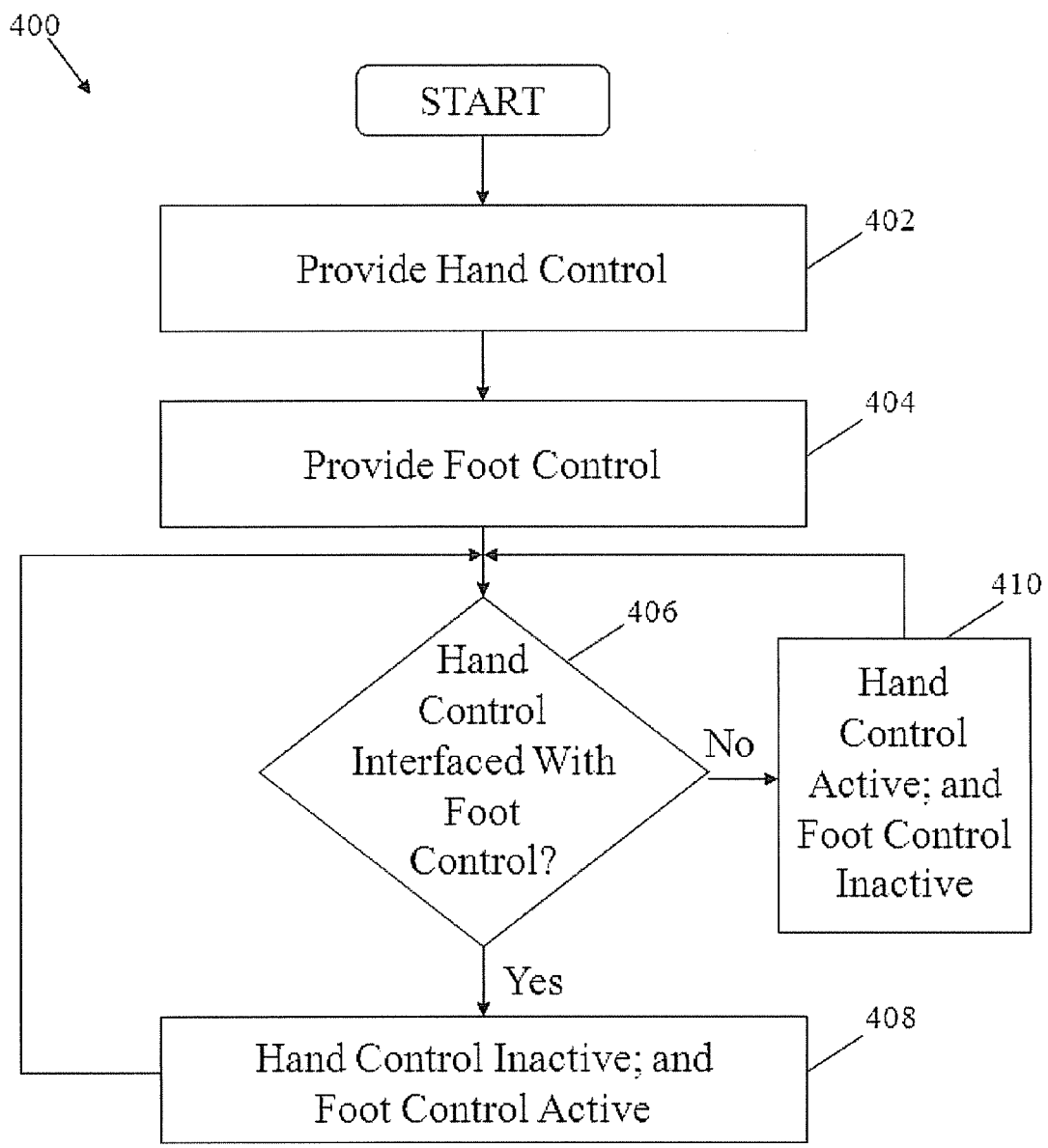
FIG. 4 is a flowchart illustrating a wireless control method for a welder, according to one exemplary embodiment.
Figure 5:
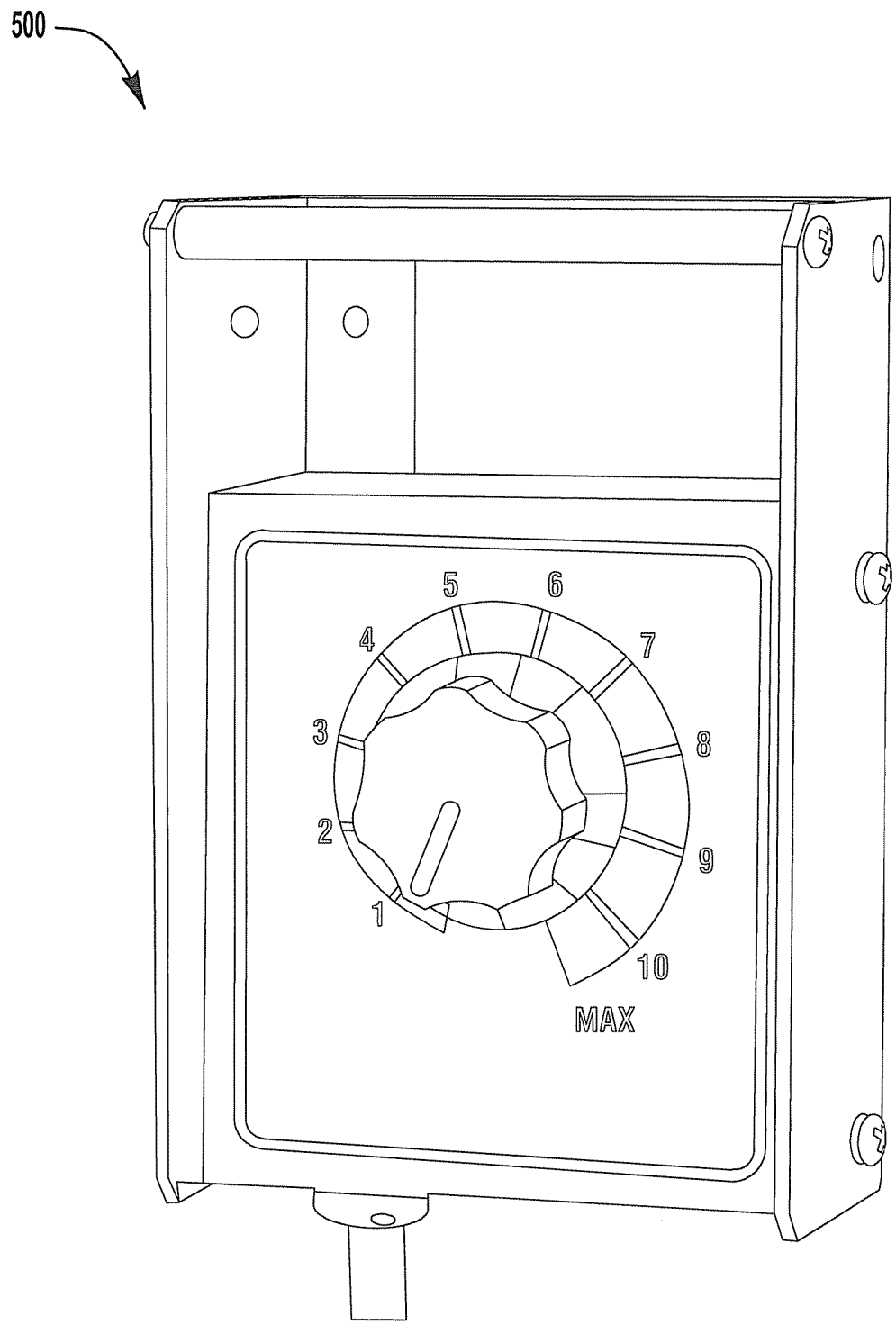
FIG. 5 is an image of a conventional hand control.
Figure 6:
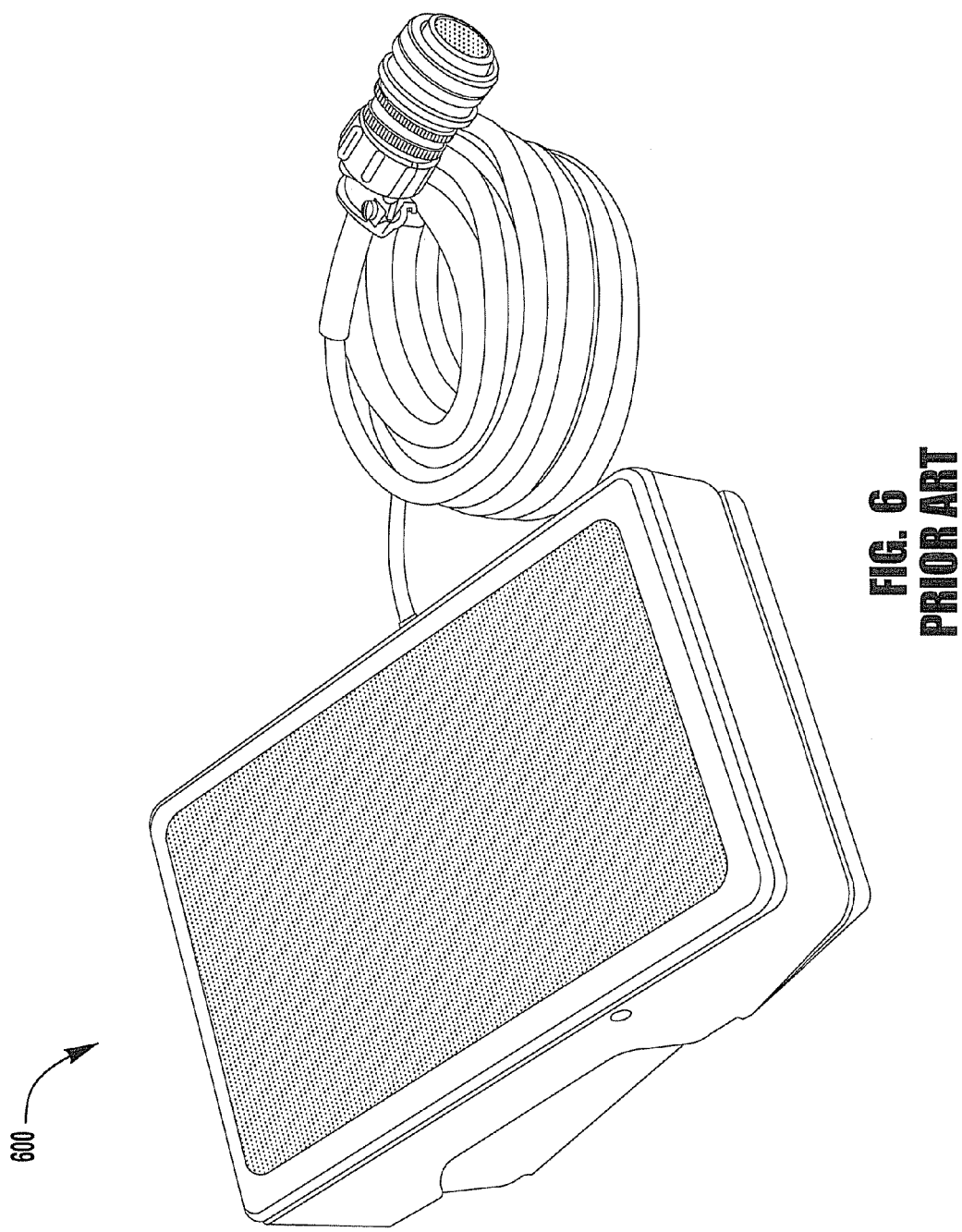
FIG. 6 is an image of a conventional foot control.

A wireless control method 400 for a welding device, according to one exemplary embodiment encompassed by the general inventive concepts, is shown in FIG. 4. The wireless control method 400 allows a user to remotely control a welding process by allowing the user to select and/or adjust one or more operating parameters of the welding device or parameters otherwise associated with the welding process. These parameters could include, for example, an electrode delivery rate, a shielding gas delivery rate, a beginning and end of a welding cycle, various characteristics of the welding arc (e.g., current or amperage, voltage, pulse frequency, initial slope, final slope), etc.

The wireless control method 400 may be used across diverse methods of welding including, but not limited to, shielded metal arc welding (SMAW) or "STICK" welding, gas metal arc welding (GMAW) also known as metal inert gas (MIG) or "wire feed" welding, and gas tungsten arc welding (GTAW) or "TIG" welding. One skilled in the art will appreciate that the wireless control method 400 may also apply to other welding methods and their associated welding devices.

According to the wireless control method 400, a hand control (e.g., the hand control 105) is provided in step 402. Additionally, a foot control (e.g., the foot control 110) is provided in step 404. The hand control and the foot control are remote controls, i.e., controls that are separate from and not physically part of the welding device itself. Furthermore, the hand control and the foot control are wireless devices that are readily portable by the user.

In the wireless control method 400, whether the hand control and the foot control are interfaced is periodically or continually checked in step 406. In one exemplary embodiment, an interface between the hand control and one or more other pieces of equipment (in addition to the foot control) is checked in step 406.

If the hand control and the foot control are interfaced, then the hand control is determined to be an inactive control while the foot control is determined to be an active control in step 408.

If the hand control and the foot control are not interfaced, then the hand control is determined to be an active control while the foot control is determined to be an inactive control in step 410.

In the wireless control method 400, only one of the hand control and the foot control is active as a remote control for the welding device at any given time. Thus, the user is able to selectively choose which type of remote control to employ at any given time. Furthermore, the user is able to readily transition from one type of remote control to the other.

The specific embodiments of wireless control systems and methods, as shown and described herein, are provided as examples of the general inventive concepts. The exemplary embodiments can readily support remote operation of a welding device by either a hand or a foot of the user through the sharing of components. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

The invention claimed is:

1. A system for controlling a welder, the system comprising:
    a first remote control device including first means for remotely adjusting an operating parameter of the welder;
    a second remote control device including second means for remotely adjusting an operating parameter of the welder; and
    logic for detecting if the first remote control device is interfaced with the second remote control device,
    wherein the second remote control device is active and the first remote control device is inactive if the first remote control device is interfaced with the second remote control device.

2. The system of claim 1, wherein the second remote control device is inactive and the first remote control device is active if the first remote control device is not interfaced with the second remote control device.

3. The system of claim 1, wherein the first remote control device is sized to fit in a hand of the user so that the user can manipulate the first means using one or more fingers on the hand.

4. The system of claim 1, wherein the second remote control device includes an upper housing and a lower housing, and
    wherein the upper housing is movable relative to the lower housing.

5. The system of claim 4, wherein the second means includes movement of the upper housing relative to the lower housing.

6. The system of claim 4, wherein the upper housing of the second remote control device includes a cavity, and
    wherein the first remote control device interfaces with the second remote control device by placement of at least a portion of the first remote control device within the cavity.

7. The system of claim 1, wherein the logic is embedded in the first remote control device.

8. The system of claim 1, wherein the first remote control device includes transmission means for enabling wireless communication between the first remote control device and the welder.

9. The system of claim 8, wherein the transmission means is an RF transceiver.

10. The system of claim 8, wherein if the second remote control device is active, the second remote control device uses the transmission means of the first remote control device to communicate with the welder.

11. The system of claim 1, wherein the first remote control device includes a power source, and
    wherein the second remote control device does not include a power source.

12. The system of claim 11, wherein the power source includes a battery.

13. The system of claim 1, wherein the first remote control device includes a display for displaying information to the user.

14. The system of claim 1, wherein the first means includes a plurality of buttons.

15. The system of claim 1, wherein the first remote control device includes a potentiometer.

16. The system of claim 1, wherein the second remote control device includes a potentiometer.

17. A method of controlling a welder, the method comprising:
    providing a first remote control device including first means for remotely adjusting an operating parameter of the welder;
    providing a second remote control device including second means for remotely adjusting an operating parameter of the welder;
    detecting if the first remote control device is interfaced with the second remote control device;
    activating the first remote control device for remote control of the welder if the first remote control device is not interfaced with the second remote control device; and
    activating the second remote control device for control of the welder if the first remote control device is interfaced with the second remote control device,
    wherein said step of detecting is performed by at least one of said first remote control device and said second remote control device.

18. The method of claim 17, further comprising:
    detecting if the first remote control device is interfaced with a piece of equipment,
    wherein if the first remote control device is interfaced with the piece of equipment, the piece of equipment uses a transmission means within the first remote control device to communicate with the welder.

19. The method of claim 18, wherein the piece of equipment is a welding helmet, and
    wherein the first remote control device disables operation of the welder if the first remote control device determines that a visor of the helmet is in an opened position.

* * * * *